United States Patent
Hebert

[11] Patent Number: 5,850,938
[45] Date of Patent: Dec. 22, 1998

[54] SYSTEM AND METHOD FOR STORING COMPOUNDS

[76] Inventor: Tony J. Hebert, 1089 Oleste Tauzin Rd., Breaux Bridge, La. 70517

[21] Appl. No.: 729,403

[22] Filed: Oct. 11, 1996

[51] Int. Cl.$^6$ ........................................... B67D 5/38
[52] U.S. Cl. .................... 222/51; 222/146.5; 222/256; 222/318; 222/392
[58] Field of Search .................. 222/51, 146.5, 222/256, 318, 340, 386, 392

[56] References Cited

U.S. PATENT DOCUMENTS

| | | | |
|---|---|---|---|
| 969,217 | 9/1910 | Stewart | 222/392 X |
| 2,443,146 | 6/1948 | Pyles | 222/318 |
| 2,545,319 | 3/1951 | Sundholm | 222/256 |
| 2,582,802 | 1/1952 | Terrell, Jr. | 222/318 X |
| 2,984,391 | 5/1961 | Watters et al. | 222/340 X |
| 3,080,154 | 3/1963 | Tanner | 222/392 X |
| 3,178,059 | 4/1965 | Packwood, Jr. | 222/256 X |
| 3,853,446 | 12/1974 | Hostettler et al. | 425/217 |
| 3,897,939 | 8/1975 | Hostettler et al. | 259/191 |
| 4,096,973 | 6/1978 | Checko | 222/146.5 |
| 4,659,578 | 4/1987 | Schlegel | 426/418 |
| 4,744,204 | 5/1988 | Schlegel | 53/526 |
| 4,796,785 | 1/1989 | Merritt | 222/131 |
| 5,044,471 | 9/1991 | Machek | 222/256 X |
| 5,207,251 | 5/1993 | Cooks | 41/83 |

*Primary Examiner*—Kenneth Bomberg
*Attorney, Agent, or Firm*—Domingue, Delaune & Waddell

[57] ABSTRACT

A system for storing, circulating and dispensing a liquid compound is disclosed. The system comprises a vessel having an open top end and a closed bottom end, with the compound being disposed within the vessel. A movable ceiling member is positioned within the vessel, with the movable ceiling member forming a first chamber and a second chamber within the vessel, and wherein the compound is located within the first chamber and the second chamber is exposed to the atmosphere. A lifting member is provided for lifting the movable ceiling member from the vessel is also included. The system may further comprise a circulation conduit operatively attached to the movable ceiling, a drain conduit operatively associated with the bottom end of the vessel, and a pump member adapted for pumping the compound from the first chamber to the circulation conduit so that the compound is circulated within the vessel. A method of storing, circulating and dispensing a fluid compound is also disclosed.

13 Claims, 4 Drawing Sheets

SYSTEM AND METHOD FOR STORING COMPOUNDS

BACKGROUND OF THE INVENTION

This invention relates to a system for storing a liquid compound. More particularly, but not by way of limitation, this invention relates to a system and method for storing, recirculating and dispensing a compound from a vessel.

Synthetic resins are used in many commercial, industrial and residential applications. Synthetic resins are a man-made high polymer resulting from a chemical reaction between two (or more) substances. Resins are used with the fabrication of many materials including but not limited to swimming pools, boats, yachts, tubs, showers, etc.

While resin is ready available, the cost is significant. Further, unless the resin is kept at specific conditions (essentially air tight, low temperature, pressure and humidity), the resin may react, form crystals and eventually become very viscous and ultimately becomes solid. If the resin solidifies before use, the resin is not only useless, but also represent a potential environmental hazard that must be disposed which is costly and time consuming.

In industrial applications such as the pool and spa manufacturing industry, the resin is transported to a manufacturing facility in tanks. From these transportation tanks, the resin is stored in vessels. Prior art systems may contain mixing means for mixing the resin within the vessel in order to keep the resin fluid. An example of a mixing means is an auger system.

The prior art systems suffer from several disadvantages. For instance, the prior art systems allow a layer of air to fill the vessel, with the air providing oxygen for possible reaction with the resin. Another problem is the systems allow the formation of hardened resin beginning with the ceiling then down along the walls of the vessel (known as stalactites or simply build-up). In time, the contaminates make the resin difficult to retrieve. The formation of the hardened resin not only waste the resin but also makes the vessel unusable. Thus, the vessel must be cleaned periodically. Further, the resin vapors escape into the air thereby creating a hazardous work environment for workers.

Therefore, there is a need for a system that will allow for the storage, circulation, recirculation and dispensing of liquid compounds. There is also a need for a system that will prevent the solidification of a synthetic resin while in the storage vessel. There is also a need for a system that will prevent resin vapors from escaping into the atmosphere.

SUMMARY OF THE INVENTION

A system for storing, recirculating and dispensing a compound is disclosed. The system comprises a vessel having an open top end and a closed bottom end, with the compound being disposed within the vessel. A movable ceiling member is positioned within the vessel, with the movable ceiling member forming a first chamber and a second chamber within the vessel, and wherein the compound is located within the first chamber and the second chamber is exposed to the atmosphere. Lifting means for lifting the movable ceiling member from the vessel is also included.

The system may further comprise a circulation conduit operatively attached to the movable ceiling, a drain conduit operatively associated with the bottom end of the vessel, and a first pump means, connected with said drain conduit, for pumping the resin compound from the first chamber to the circulation conduit so that the resin compound is circulated within the vessel to be kept ideally workable.

In one embodiment, the lifting means comprises a line (cable) member having a first end and a second end, with the first end being attached to the movable ceiling, and a swivel boom member being attached to the outer portion of the vessel, with the second end of the line being attached to the swivel boom member so that said movable ceiling member may be lifted from the container and turned away from the tank.

In yet another embodiment, the vessel will include therewith washing-spray means, adapted within the container including at the bottom and top portion of the container, for spraying the resin within the first chamber of the vessel. Also, the ceiling member may contain on its outer diameter means for sealing with the inner portion of the vessel so that a minimum amount of air is allowed within the first chamber of the vessel.

In accordance with the teachings of the present invention, the system may further comprise: selective valve means, operatively associated with the drain conduit, for selectively directing the flow of the compound; a second pump means, operatively associated with the selective valve means, for pumping the resin from the drain conduit; and, a supply conduit means, operatively associated the second pump means, for supplying the compound from the second pump means to a supply line for plant use.

The system may also include a liquid level means, operatively associated with the swivel boom, for determining the position of the ceiling within the vessel. Also included within one embodiment is a temperature control means, associated with the circulation conduit, for measuring the temperature and heating the compound based on the measured temperature of the compound.

An advantage of the present invention includes the reduction of waste of the expensive resin compound. Another advantage includes eliminating contamination inside the vessel while the plant also does not have the problem of getting the good resin out. Yet another advantage includes the operator will experience significantly less down time to enter and clean the vessel. Yet another advantage is the novel sealing mechanism prevents the vapors from escaping from the first chamber.

Yet another advantage is the resin, due to the novel storing technique, is more fluid. Therefore, the resin will be easier to pump and dispense when the resin is required for use and application. Still yet another advantage is the novel system can be constructed economically.

A feature of the present invention includes a movable ceiling that essentially floats on top of the resin within the vessel. Another feature is use of a swivel boom that is used to lift the ceiling from the vessel, and thereafter, may be swiveled clear of the vessel for inspection and/or entry. Another feature is use of a circulating conduit that will allow the circulation of the resin within the tank thereby keeping the resin fluid.

Yet another feature is that either no air or a minimum of air is allowed in the first chamber so that the thickening of the resin on the ceiling and walls are minimized. Another feature includes use of a thermostatically controlled heating unit that heats the resin to ensure fluidity. Still yet another feature is the multi-directional return head for wash-spraying the recirculated and/or new resin within the vessel via the circulation conduit. The wash-spraying means can introduce re-circulated resin at the top and bottom portion of the vessel.

DESCRIPTION OF THE PREFERRED EMBODIMENTS

Figure 1:
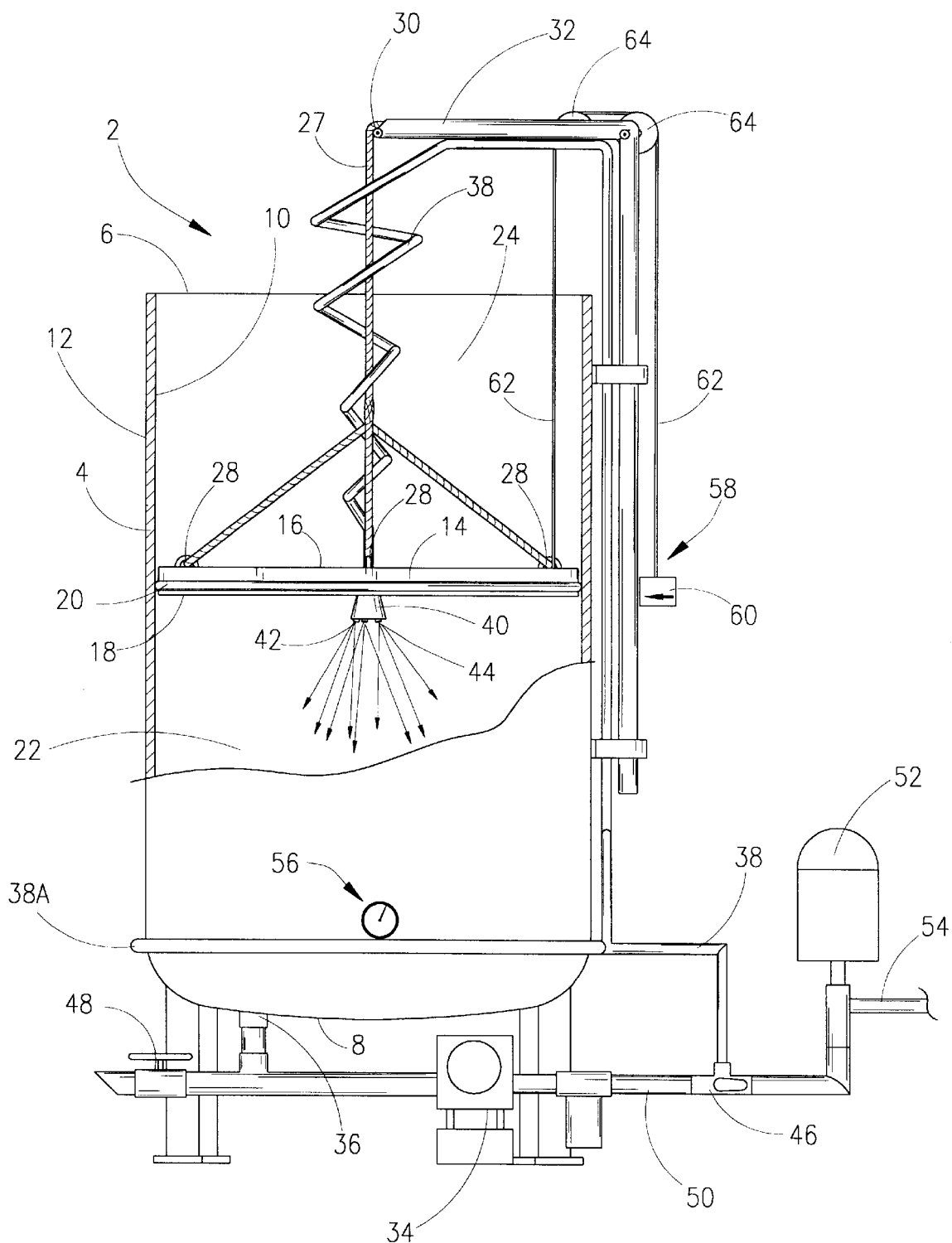
FIG. 1 is a schematic illustration of the preferred embodiment of the present invention.

Referring now to FIG. 1, a schematic illustration of the preferred embodiment of the present invention is depicted. The system 2 comprises a vessel 4 that has a top end 6 which is open-ended. The vessel 4 also has a bottom end 8 that is closed-ended. In the preferred embodiment, the vessel 4 is a cylindrical member having an inner portion 10 and an outer portion 12

The movable ceiling member 14 is disposed within the inner portion of the vessel 4. The movable ceiling member 14 has a first side 16 and a second side 18. The movable ceiling member will have an outer diameter that is adapted to be received within the vessel 4 and cooperate with the inner portion of said vessel 10.

Figure 2:
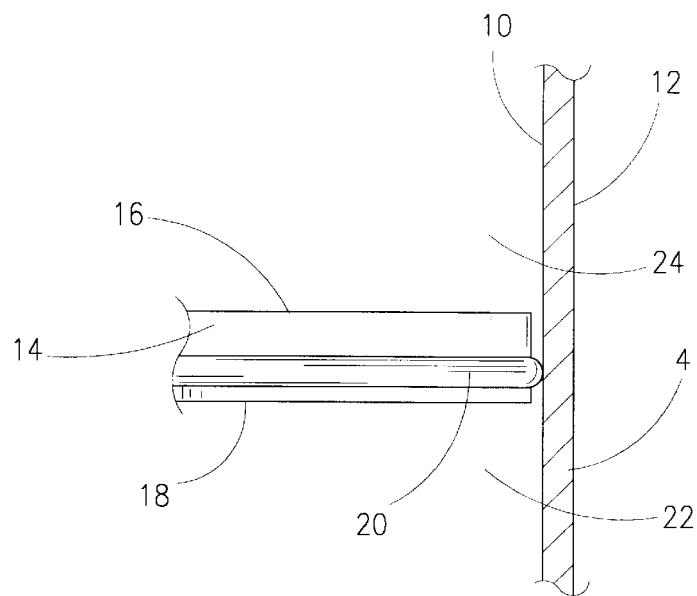
FIG. 2 is an enlarged view of the ceiling member taken from FIG. 1.

In the preferred embodiment, the outer diameter of the movable ceiling member 10 contains means for sealing 20 as is depicted in FIG. 2. The ceiling member 14 effectively provides for a first chamber 22 within the vessel 4 as well as a second chamber 24. Thus, the sealing means 20 will be up against the inner portion 10 of the vessel 4 so that communication between the first chamber 22 and the second chamber 24 is significantly reduced. In the preferred embodiment, the sealing member is a teflon o-ring member fitted about the circumference of the ceiling member 14.

Referring again to FIG. 1, the system 2 will also include lifting means 26 for lifting the movable ceiling member 14 which in the preferred embodiment is a cable 27 that is attached at one end 28 to the movable ceiling 14 and at the second end 30 to the swivel boom 32 so that the movable ceiling member 14 may be lifted from the vessel 4. In order to lift the ceiling 14, the operator may exert a pull on the wire 27 by mechanical or manual means.

FIG. 1 also depicts the first pump means 34 for pumping the compound from the first chamber 22 via the drain conduit 36 to the circulation conduit 38 so that the compound is circulated within the vessel 4. In the preferred embodiment, the first pump means 34 is a diaphragm type of pump that is commercially available from Greyco Inc. under the mark diaphragm pump. The drain conduit 36 is generally connected to the bottom end 8 of the vessel and leads to the first pump means 34.

The circulation conduit 38 will extend from the first pump means 34, up the vessel 4, follow the swivel boom 32, and thereafter be connected through the movable ceiling 14. Thus, the compound is circulated from the bottom portion 8 of the vessel to the top portion of first chamber 22 ensuring circulation and proper mixing of the compound which prevents premature compound reaction and solidification.

The circulation conduit 38 will be operatively associated with a multi-directional spray means 40 for spraying the recirculated compound within the first chamber 22. The nozzles 42 and 44 employed with the spray means 40 provide for multiple direction jetting of the compound to ensure proper mixing. It should be noted that the prior art types of mixing requires an auger which is not efficient and is prone to build-up with material left behind.

Also associated with the system herein described will be the selective valve means 46, which is operatively associated with he drain conduit 36, for selectively directing flow of the compound to the second pump means 52. Another valve 48 has been provided with the system 2 shown, said valve 48 may be used to drain the compound from the first chamber 22.

The circulation conduit 38 may be branched off to a discharge line 50, with the discharge line 50 being operatively associated with a second pump means 52 for pumping the compound from the first chamber 22. The second pump means 52 is of the type that is commercially available from Binks Inc. under the mark shaft pump. The second pump means 52 may pump the compound to a container, gun, roller, impregnator etc via supply conduit line 54 for eventually plant use of the compound by the operator.

The system 2 may also include a temperature control means 56, associated with the circulation conduit 38, for measuring the temperature of the compound exiting chamber 22. The temperature control means 56 may contain a heating element, responsive to pre-determined temperature range which will serve to activate the heating element once the temperature of the compound falls below a pre-set level. The temperature control means 56 will thereafter heat the compound to a desired level.

Also disclosed herein is a liquid level means 58, operatively associated with the swivel boom 32, for determining the position of the ceiling 14 within the vessel 4. The liquid level means 58 may be a weight 60 attached to a line 62, with the line 62 being attached to the ceiling 14 and the pulley members 64.

Figure 3:
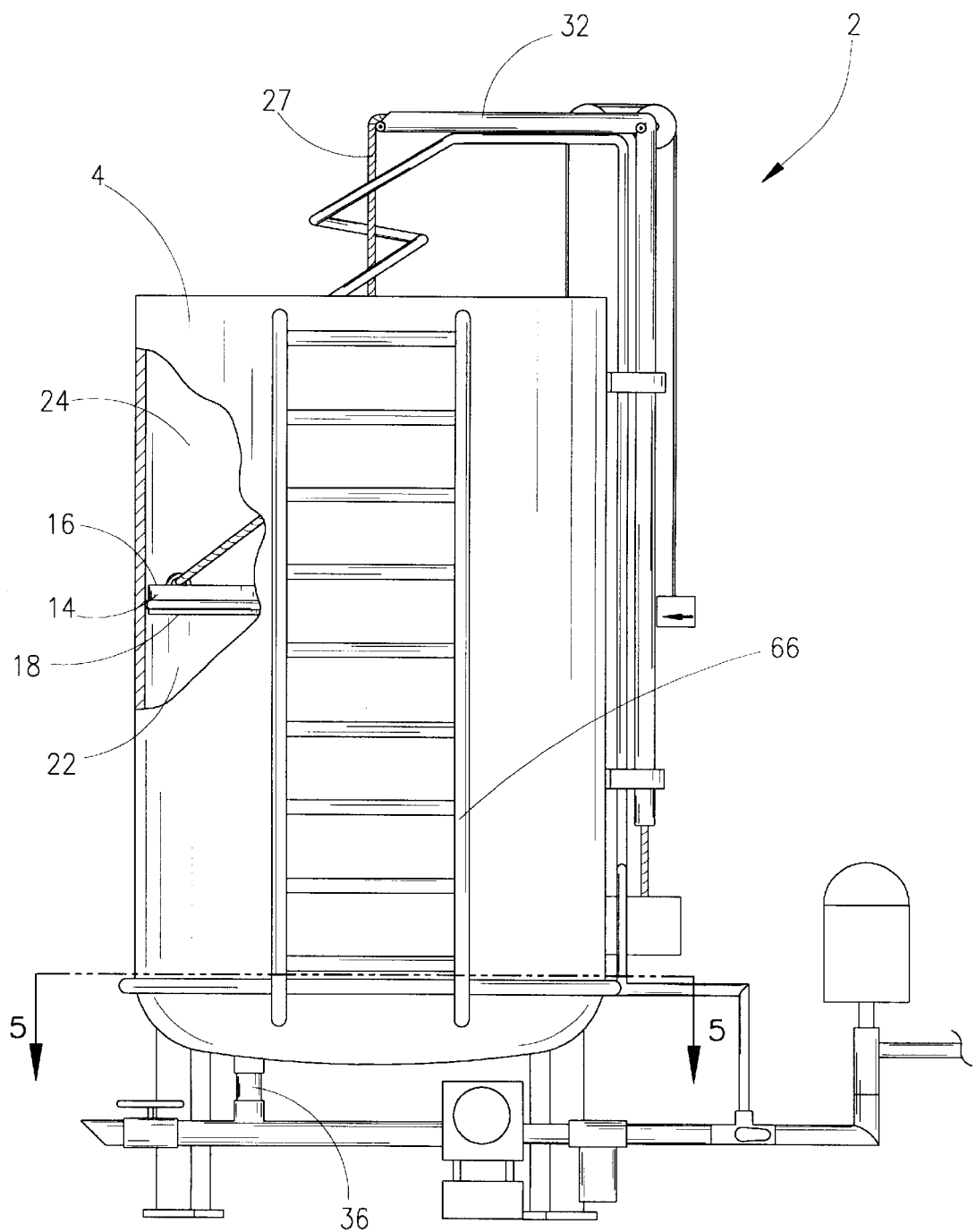
FIG. 3 is a schematic illustration of the present invention with the ceiling member positioned within the vessel.

Referring now to FIG. 3, a schematic illustration of the present invention with the ceiling member 14 positioned within the vessel 2 will now be described. It should be noted that like numbers appearing throughout the application refer to like components. Thus, the movable ceiling 14 is resting on the compound contained within the first chamber 22. While the ceiling 14 is resting on the compound, there is little or no air allowed between the top layer of compound and the surface 18.

Further, as the compound is pumped from the vessel 4, the movable ceiling 14 moves downward in accordance with the teachings of the present invention. Also as seen in the position of FIG. 3, the compound may be circulated utilizing the circulation conduit 38 in connection with the first pump means 34 as previously described. It should also be noted that the vessel 4 contains a ladder 66 so that the operator may make physical inspections of the inner portion of the tank and chamber 24. Due to the novel design, the release of the fumes from the compound are greatly reduced. Thus, if the compound contains compounds such as styrene, this is a significant advantage of the present invention. Further, as the compound is added to the chamber 22, the ceiling 14 may move upward. Again, the air layer is minimized due to the novel design herein disclosed.

Figure 4:
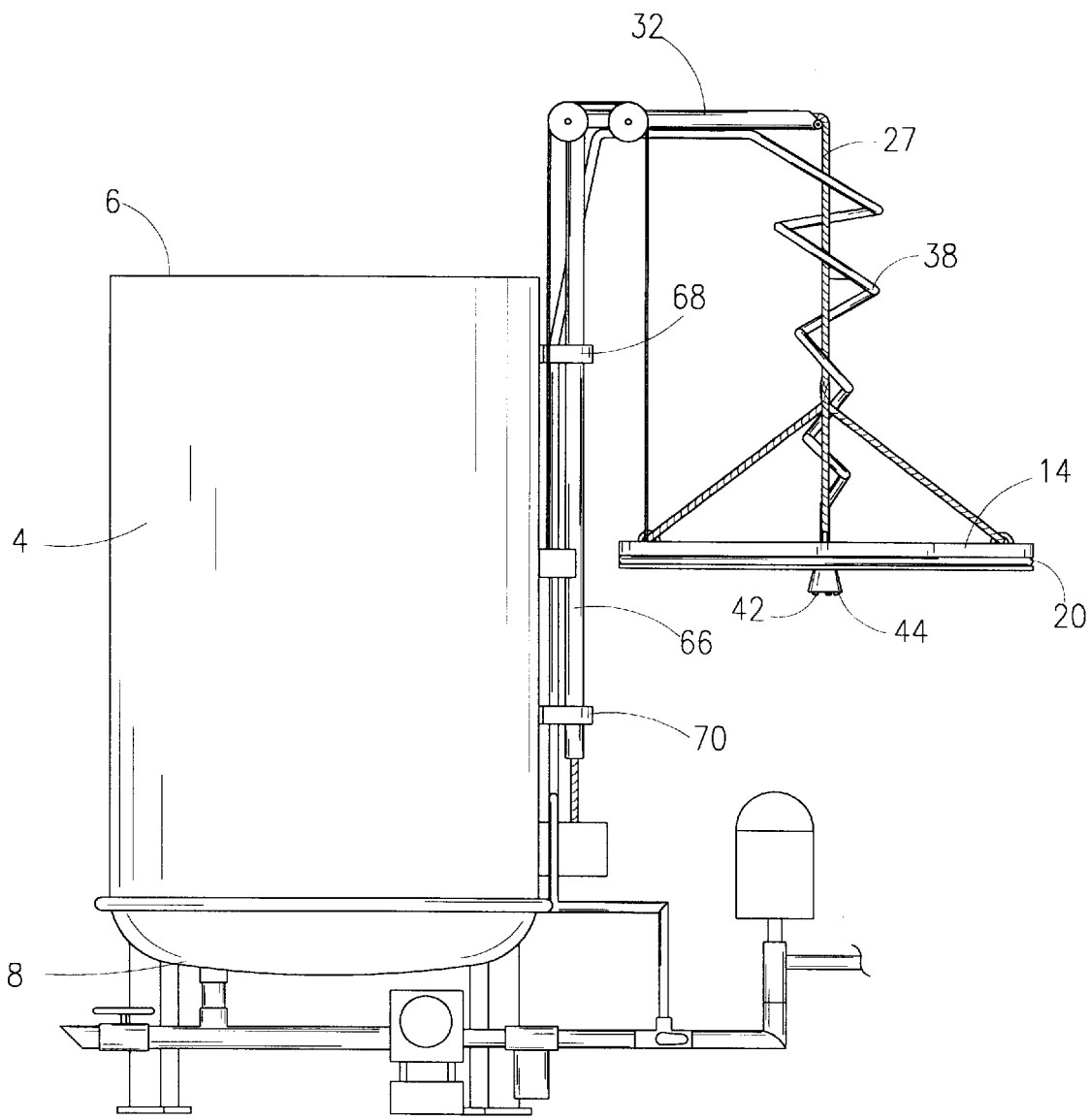
FIG. 4 is a schematic illustration of the present invention with the ceiling member positioned away from the vessel.

Referring now to FIG. 4, a schematic illustration of the present invention with the ceiling member 14 positioned away from the vessel 4 will now be described. Thus, the ceiling 14 has been lifted via the swivel boom 32 and cable 27. The swivel boom has a vertical member 66 that rotates within the clamps 68, 70. The swivel boom 32 has been rotated clear of the vessel opening. The operator may then enter the vessel to perform any necessary and/or routine maintenance including but not limited to cleaning the compound from the vessel. It should be noted that it is possible to have a door on the bottom portion of the vessel.

Figure 5:
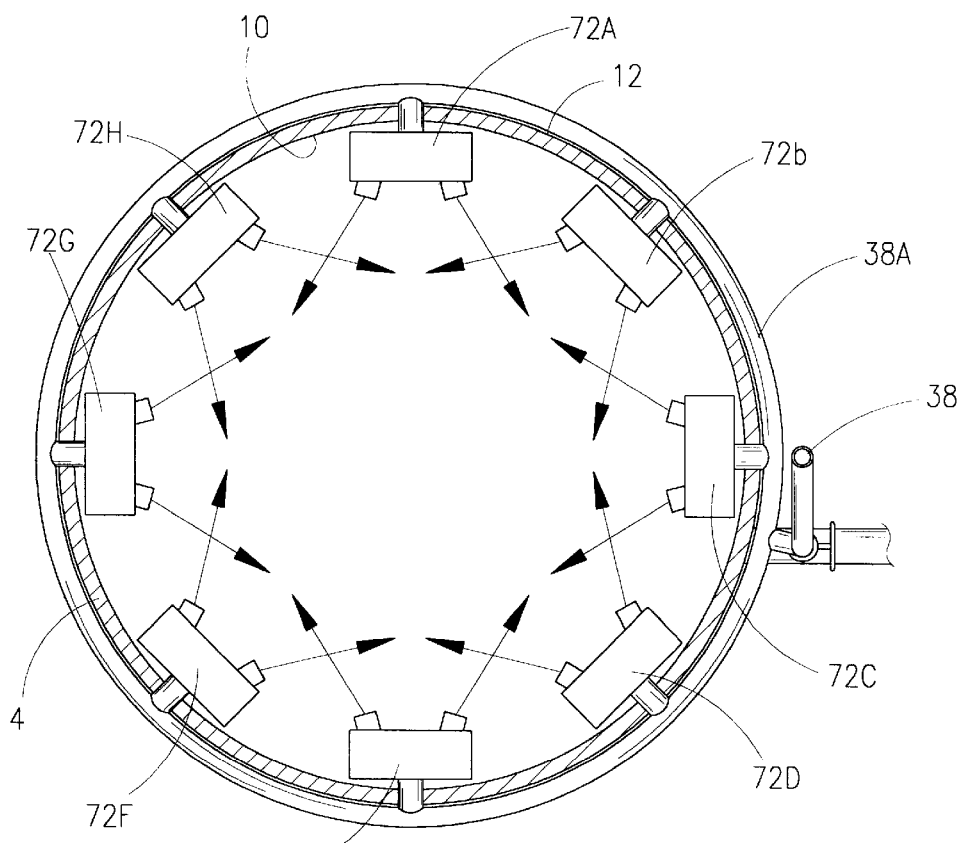
FIG. 5 is a cross-section taken along line A—A of FIG. 3 depicting the lower wash-spraying means of the invention on the floor of the vessel.

In FIG. 5, a cross-section taken along line A-A of FIG. 3 depicting the lower wash-spraying means 72 of the invention. The lower spraying means 72 (72A, 72B, 72C, 72D, 72E, 72F, 72G, 72H) are utilized for injecting the compound into the bottom end 8 so that vessel 4 is rinsed. This lower injection takes place periodically as part of a regular cycle aimed at cleaning the vessel 4 and preventing compound from solidifying and/or forming crystals, particularly at the bottom of the vessel 4. The circulation conduit 38 will branch off to the lower section 38A so that as the pump means 34 pumps to the circulation conduit 38, the pump 34 will also direct the resin to the lower wash-spraying means 72 via ciruclation conduit 38A.

As shown, each spraying means 72, in the preferred embodiment, contains a first and second nozzle that directs the injected compound within the inner portion 10 of the vessel 4. The number of nozzles and there trajectory may be varied depending on variables such as tank inner diameter and solution viscosity. Thus, during operation, the operator may have the upper multi-direction spray means 40 and the lower spraying means 72 circulating the resin in accordance with the disclosure herein.

The teachings of the present invention are applicable to the storage of different types of compounds. In fact, any type of compound that exist in a fluid state may be stored and dispensed utilizing the teachings of the present invention. The system 2 is, however, particularly suited to the storage of resins utilized in the commercial, residential and industrial applications. For instance, in the pool fabrication industry, a resin consisting of an unsaturated polyester resin and a styrene may be utilized. Examples of this type of resin is commercially available from Interplastic Corp. under the product name "COR75-AB-022" or "CORVE8115, Vinyl Ester Resin". Both the polyester component as well as the styrene component have certain hazardous effects and are subject to government regulations as to handling and storage.

Thus, in accordance with the teachings of the present invention, the handling and storage is made safe to personnel. Further, the compound are kept in conditions encouraging longer shelf lives and usefulness. Also, the vessel, pumps, valves etc will require fewer repairs and replacements.

In operation, the compound is pumped into the vessel 4. The ceiling 14 is placed on top of the compound. The ceiling 14 will allow little or no air between the under side surface 18 and the compound. The operator may then circulate the compound utilizing the first pump means 34 and circulation conduit 38, as previously described, which in turn delivers the recirculated compound to the multi-direction return head spray means 42, 44.

The operator may also direct the drain conduit 36 to the second pump means 52 and in turn to the line 54 for eventual use of the compound by the operator. Alternatively, the inner portion 10 of the vessel 4 may be checked by the operator by lifting of the ceiling and the swiveling of the boom 32. A visual inspection may take place and necessary maintenance may be performed.

The temperature of the resin may also be checked utilizing the thermostat temperature control means 76, associated with the circulation conduit 36, for measuring the temperature of the compound within the vessel 4 and heating the resin based on the measured temperature of the resin. The temperature is raised to a predetermined level deemed appropriate to maintain the appropriate viscosity. Also, the lower spraying means 72 (72A, 72B, 72C, 72D, 72E, 72F, 72G, 72H) may be utilized in one embodiment for injecting the compound into the bottom end 8 so that the vessel 4 is rinsed. This injecting takes place periodically as part of a regular cycle aimed at cleaning the vessel 4 and preventing compound from solidifying and/or forming crystals.

Changes and modifications in the specifically described embodiments can be carried out without departing from the scope of the invention which is intended to be limited only by the scope of the appended claims.

I claim:

1. A system for storing a compound comprising:

a container having a first end and a second end, with the first end being open and the second end being closed, said container further having an inner portion and an outer portion;

a ceiling member operatively positioned within the inner portion of said container;

a line having a first end and a second end, with the first end being attached to said ceiling member; and a swivel boom attached to said second end of said line.

2. The system of claim 1 further comprising:

a circulation conduit operatively attached to said ceiling member;

a drain conduit operatively associated with the second end of said container;

first pump means having an input that is connected with said drain conduit and an output that is connected to said circulation conduit.

3. The system of claim 2 wherein said ceiling member has an outer diameter, and wherein said outer diameter of said ceiling member has contained thereon means for sealing with the inner portion of said container.

4. The system of claim 3 further comprising:

spray means, located at the second end of said container and fluidly connected with said circulation conduit, for spraying the compound within the container.

5. The system of claim 4 further comprising:

selective valve means, operatively associated with said drain conduit, for selectively directing flow of the compound;

second pump means, operatively associated with said selective valve means, for pumping said drain conduit;

supply conduit means, operatively. associated said second pump means, for supplying the compound from the first pump means.

6. The system of claim 5 further comprising:

liquid level means, operatively associated with said swivel boom, for determining the position of said ceiling within said container.

7. An apparatus comprising:

a vessel having a first end and a second end, with the first end being open and the second end being closed, said vessel further including an inner portion and an outer portion, with a liquid compound being disposed within said inner portion of said vessel;

a movable ceiling member positioned within said vessel, said movable ceiling member forming a first chamber within said vessel and a second chamber within said vessel, and wherein the compound is located within said first chamber and said second chamber is exposed to atmosphere;

means for lifting said movable ceiling member from said vessel; and wherein said lifting means comprises: a line member having a first end and a second end, with the first end being attached to the movable ceiling member, a swivel boom member being attached to said outer portion of said vessel, with said second end of said line being attached to said swivel boom member so that said movable ceiling member may be lifted from said vessel;

a circulation conduit operatively attached to said movable ceiling member;

a drain conduit operatively associated with the second end of said vessel; and a first pump means having an input connected with said drain conduit and an output connected to said circulation conduit so that the compound is circulated within said vessel.

8. The apparatus of claim 7 wherein the liquid compound is a synthetic resin, and wherein the apparatus further comprises:

spray means, within said vessel and fluidly connected with said circulation conduit, for spraying the resin within said first chamber of said vessel.

9. The apparatus of claim 8 wherein said ceiling member has an outer diameter, and wherein said outer diameter of said ceiling member has contained thereon means for sealing with the inner portion of said vessel so that air from the atmosphere is not allowed within said first chamber of said vessel.

10. The apparatus of claim 9 further comprising:

selective valve means, operatively associated with said drain conduit, for selectively directing flow of the resin;

second pump means, operatively associated with said circulation conduit, for pumping said compound from said first chamber;

supply conduit means, operatively associated said second pump means, for supplying the resin from the first-pump means for plant use.

11. The apparatus of claim 10 further comprising:

liquid level means, operatively associated with said swivel boom, for determining the position of said ceiling member within said vessel.

12. The system of claim 11 wherein the resin consist of: an unsaturated polyester and a styrene.

13. The system of claim 12 further comprising:

temperature control means, associated with the drain conduit, for measuring the temperature and heating the resin based on the measured temperature of the resin.

* * * * *